United States Patent
Walters et al.

[11] Patent Number: 5,996,815
[45] Date of Patent: Dec. 7, 1999

[54] DISPLAY AND STORAGE SYSTEM

[76] Inventors: Drake R. Walters; Charles R. Schrall, both of P.O. Box 9382, Rancho Santa Fe, Calif. 92067

[21] Appl. No.: 09/234,128

[22] Filed: Jan. 11, 1999

[51] Int. Cl.[6] .................................................. A47F 7/00
[52] U.S. Cl. .......................... 211/40; 211/41.12; D6/407
[58] Field of Search .................................. 211/40, 41.12, 211/88.01, 87.01; 206/308.1; 40/124, 124.2, 124.4; D6/407

[56] References Cited

U.S. PATENT DOCUMENTS

| | | | |
|---|---|---|---|
| D. 353,736 | 12/1994 | Wenkman | D6/407 X |
| 1,388,010 | 8/1921 | Watson . | |
| 4,750,282 | 6/1988 | Zennedjian | 40/152 |
| 4,919,287 | 4/1990 | Haskett | 211/40 |
| 4,951,826 | 8/1990 | Tompkins | 211/40 |
| 4,979,323 | 12/1990 | Wenkman et al. | 40/152.1 |
| 5,040,687 | 8/1991 | Whittington | 211/40 |
| 5,075,991 | 12/1991 | Wenkman et al. | 40/152.1 |
| 5,232,089 | 8/1993 | Kim | 211/40 X |
| 5,415,296 | 5/1995 | Wright | 211/40 |
| 5,603,415 | 2/1997 | Balnis | 211/40 |
| 5,622,270 | 4/1997 | Bezos | 211/41.12 |
| 5,706,955 | 1/1998 | Andersson | 211/40 |
| 5,769,244 | 6/1998 | Wyatt | 211/40 |

*Primary Examiner*—Robert W. Gibson, Jr.
*Attorney, Agent, or Firm*—Frank G. Morkunas

[57] ABSTRACT

A storage unit for disk cases, photographs, or other display-oriented objects having a back plate, four side walls adjacent to the back plate, a first side member and a second side member adjacent to two side walls forming a lip-like structure for holding an object therein, a bias mechanism on the back plate for applying outward force to the object as the object is inserted into the storage unit and for applying that force to the object and against the two side members after the object has been seated into the storage unit and for facilitating removal of the object such that the object may easily be grasped. The back plate further has one or more fixed or removable pin-like members protruding therefrom for holding the storage unit onto an external surface after the pin-like members have been pushed into the external surface.

28 Claims, 3 Drawing Sheets

DISPLAY AND STORAGE SYSTEM

CROSS REFERENCES TO RELATED APPLICATIONS

Not applicable

STATEMENT REGARDING FEDERALLY-SPONSORED RESEARCH OR DEVELOPMENT

Not applicable

BACKGROUND OF THE INVENTION

This present invention relates to an improvement in display and storage systems, and more particularly to storing and displaying CD cases, DVD cases, artwork, photographs, and other entertainment-related and display-oriented objects and medium and/or their respective housings or cases.

Conventionally compact disks(CDS), digital video disks (DVDs), assorted video games (such as for the Sony Playstation®, Nintendo 64®, and Sega Saturn® for example), and other entertainment-related medium come housed in a case containing that medium (the CD, DVD, cartridge, and the like). For simplicity of discussion, the medium within (whether CD, DVD, cartridge, and the like) shall be referred to generically herein as a disk. The cases, photographs, artwork, and the like shall be referred to generically herein as objects. In the case of CD's and DVD's, the case housing the disk generally has a vertical border on the left side and a transparent face adjacent to the border which opens to expose the disk and facilitate its removal for use. A label or cover, under the face, generally adorns the front of the case. These covers oftentimes are rather ornate and artful and suitable for display. Much time and effort is spent on crafting a cover which is eye-catching and appealing. In fact, in the music industry, such covers are the subject of acclaim, if warranted, and award. The artistry and/or photography and design on many such covers warrants display.

Current storage units for the cases, however, though suitable for storing vast quantities of such cases, are not suited for display. These storage units are designed to optimize storage capacity rather than to display. They generally are configured like book cases, with or without slots for case insertion and may be on a carousel or a fixed base. The cases are generally inserted horizontally with the front or back of the case placed in the storage unit with one thin side of the case exposed to view while the other cases are similarly stacked on top of the lower case; or the cases may be inserted vertically with one thin side being exposed to view. Generally the exposed side in both storing methods is the side containing the title or name of the disk enclosed therein. The artwork and design of the cover remains hidden from view.

The present invention, though functioning as a storage unit and storage system, focuses on and takes advantage of displaying the ornate covers while permitting flexibility of storage configuration and capacity.

Accordingly, several objects and advantages of the present invention are:

a. to provide a storage unit for displaying objects such as artwork, photographs, and the covers of the cases containing the disks;

b. to provide a flexible type of storage unit which is easy to install, reconfigure, and remove;

c. to permit easy access and use of the stored object or the disk within the case;

d. to provide a storage unit which can easily increase or decrease in size and capacity without affecting the overall structure and appearance of the storage system;

e. to provide a storage unit which can easily increase or decrease in size and capacity and, if so desired, alter the overall structure and appearance of the storage system; and f. to provide a low-cost display storage unit.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a storage unit for various display-oriented objects (such as, but not limited to disk cases, artwork, photographs, and the like) having a back plate, at least one side wall adjacent to the back plate, at least one side member adjacent to the side wall forming a lip-like structure for holding an object therein, a bias mechanism on the back plate for applying outward force to the object as it is inserted into the storage unit and for applying that force to it and against the the side member after it has been seated into the storage unit. The back plate further has one or more pin-like members protruding therefrom for mounting and securing the storage unit onto an external surface after the pin-like members have been pushed into that external surface.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
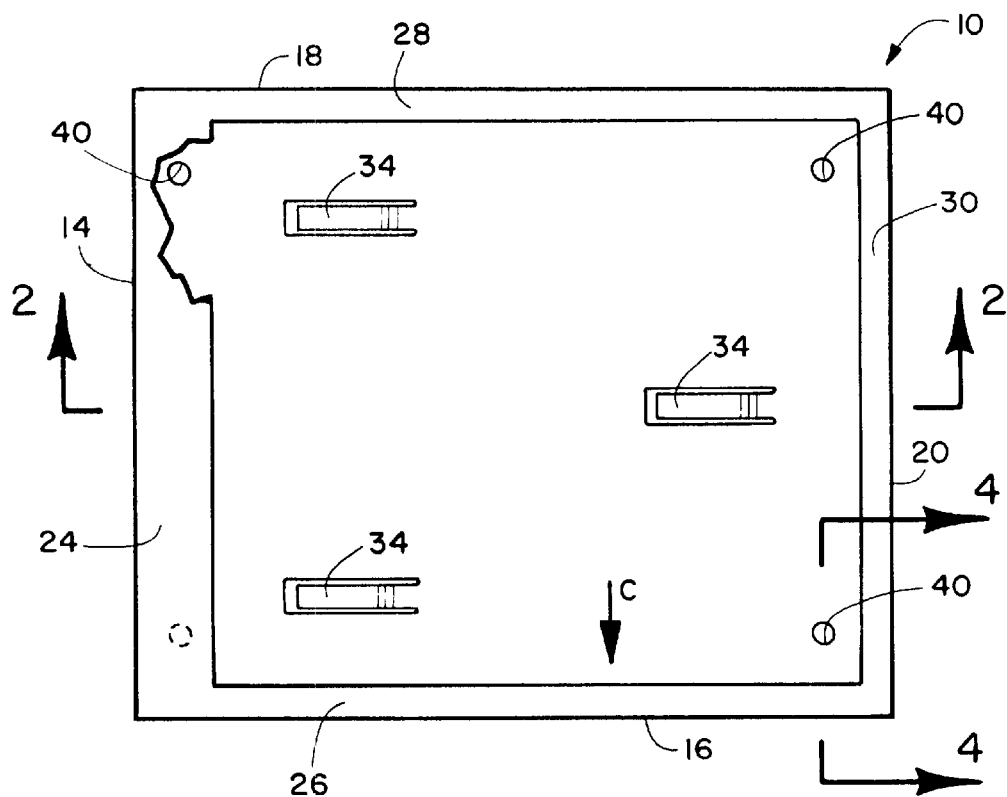
FIG. 1 is a plan view of a single storage unit.

Referring now to the drawings in detail and in particular to FIG. 1, reference character 10 generally designates a single storage unit constructed in accordance with a preferred embodiment of the present invention. The storage unit 10 here is illustrated as a single-piece construction but the storage unit may consist of any one or more such storage units 10 individually combined or constructed as two-, three-, four-, or more-piece units. The same features described here apply for a single unit construction as well as for a multiple unit construction.

Figure 2:
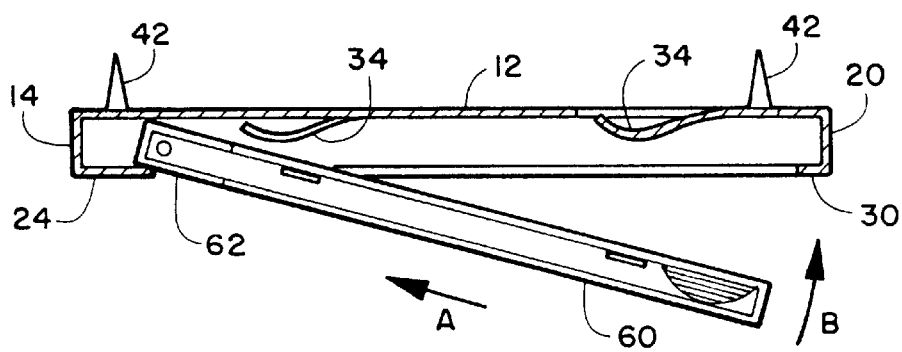
FIG. 2 is a cross-section view of the storage unit, with a case being inserted therein, taken on line 2—2 of FIG. 1.

In the preferred embodiment, the single-piece storage unit 10 as illustrated has a back plate 12 and up to four upstanding or protruding side walls 14 (left side wall), 16 (bottom side wall), 18 (right side wall), 20 (top side wall) around the perimeter of the back plate 12. A left side member 24 is adjacent to the left side wall 14 and above the back plate 12 forming a lip over, and a space between, the back plate 12 and the left side member 24. This space is adapted to receive a disk case or housing. FIG. 2 illustrates the insertion of a CD case 60 into the space formed by back plate 12, left side wall 14 and left side member 24. As with most such cases, it has a side border 62 which generally serves as a hinge-type opening mechanism for the CD case. This side border 62 generally is plain and has no basic design or artwork. A label for the CD case 60 shows through the remaining front of the case. This label bears the artwork and design for the CD case 60.

The storage unit 10 has a bias mechanism 34, one or more, on the back plate 12. This bias mechanism 34 may be a protruding tab or cut-out from the back plate 12, it may be a spring or spring-like member 36 attached to the back plate 12, or any other similar mechanism suited for the intended purpose and capable of exerting outward force when a case 60 is inserted into the storage unit 10 and pressed against such mechanism.

Figure 3:
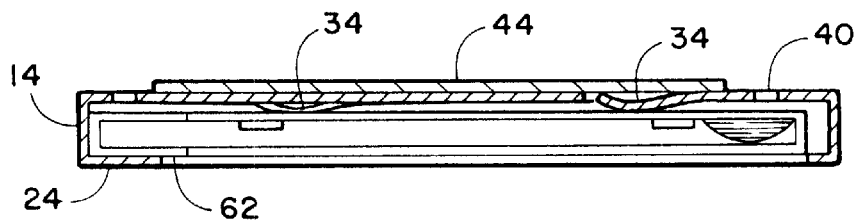
FIG. 3 is a cross-section view of the storage unit, with a case contained therein, taken on line 2—2 of FIG. 1.

Referring now to FIGS. 1 through 3, a case 60 is first inserted, in the direction of arrow A into the storage unit 10 into the space formed by back plate 12, left side wall 14, and left side member 24. After the side border 62 nears or touches the left side wall 14, the case 60 is moved in the direction of arrow B and into the storage unit 10. This movement compresses the bias mechanism 34 which exerts outward pressure on the case 60. After the case 60 nears or touches the back plate 12, the case is moved downward in the direction of arrow C (FIG. 1). Once so placed, the outward force exerted by the bias mechanism 34 forces the case 60 against the left side member 24 and against the bottom member 26 thereby securing the case 60 in the storage unit. FIG. 3 illustrates a seated case 60 as it rests against the left side member 24 and the bottom member 26 with the bias mechanism 34 compressed back toward the back plate 12. To remove the case 60, one need only to push the case 60 upward (opposite direction of arrow C in FIG. 1). As the bottom of the case 60 clears the bottom member 26, the outward force being exerted by the bias mechanism 34 pushes the case 60 outward so that it may be grasped and extracted from the storage unit 10.

The storage unit 10 may be finished off with a top side member 28 and a right side member 30. This gives the storage unit 10 a finished appearance and enhances the display of the case 60 cover artwork. Depending on how a case 60 is inserted and adjusted within the storage unit 10, these top and right side members 28, 30 may also serve the function of assisting in retaining a case 60 within the storage unit 10.

Figure 6:
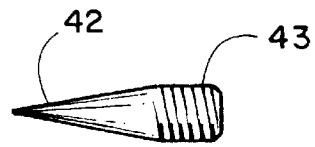
FIG. 6 is a detailed view of a pin fastener for the storage unit.
Figure 4:
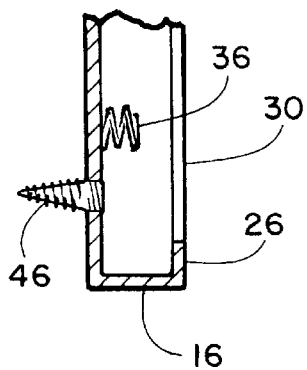
FIG. 4 is partial cross-section view of the storage unit taken on line 4—4 of FIG. 1.

The versatility of the storage unit 10 is further enhanced by the addition of means to adhere the storage unit 10 to any external surface. For this function, the storage unit 10 has one ore more apertures 40. In FIG. 1, four such apertures are shown for illustration purposes and not by way of limitation. The storage unit 10 may be affixed to an external surface, such as a wall, ceiling, door, board, or any like structure, by inserting a fastener through the aperture 40 and into the desired external surface. Any fastener, such as a nail, screw, bolt, rivet, or similar fastener, whether corrugated, cylindrical, hollowed, or any geometric shape, suited for the intended purpose will suffice. In the preferred embodiment, a pin-like or nail-like fastener 42 projects from the back plate 12 as illustrated in FIGS. 2 and 4. A detailed illustration of this fastener is illustrated in FIG. 6. This type fastener 42 is removably attached to the back plate 12. This feature enhances the versatility of the storage unit 10. In this preferred embodiment, the aperture 40 has a threaded inner surface. The fastener 42 (FIG. 6) is a pin-like or nail-like structure on one end and has corresponding threading 43 on the other end. In using this embodiment, a user may thread the fastener 42 into one or more apertures 40 and once so inserted, place the storage where desired and merely push it into place. The pins 42 pierce the external surface and mount thereon. This simplifies mounting a single storage unit 10, mounting multiple storage units, rearranging the mounting scheme, and removing one or more units as desired without affecting the remaining storage display system. Once removed, because of the small punctures made by the pin-like fasteners, need of repair of the external surface is virtually eliminated or at least simplified. FIG. 4 illustrates a similar type fastener but one which has ridges or ripples 46 on its outer surface to add holding strength and support to the mount.

Another embodiment for the adhering means is illustrated in FIG. 3. This feature employs an adhesive layer or strip 44 on the exterior surface of the back plate 12. One or more such layers or strips 44 may be applied to each storage unit. Any suitable conventionally available adhesive strip, suited for the intended purpose, may be used. A user may dispense with the adhesives 44 and the pin-like members 42 and merely nail, screw, bolt, rivet, or the like, the storage unit 10 through the aperture and into the desired external surface.

Figure 5:
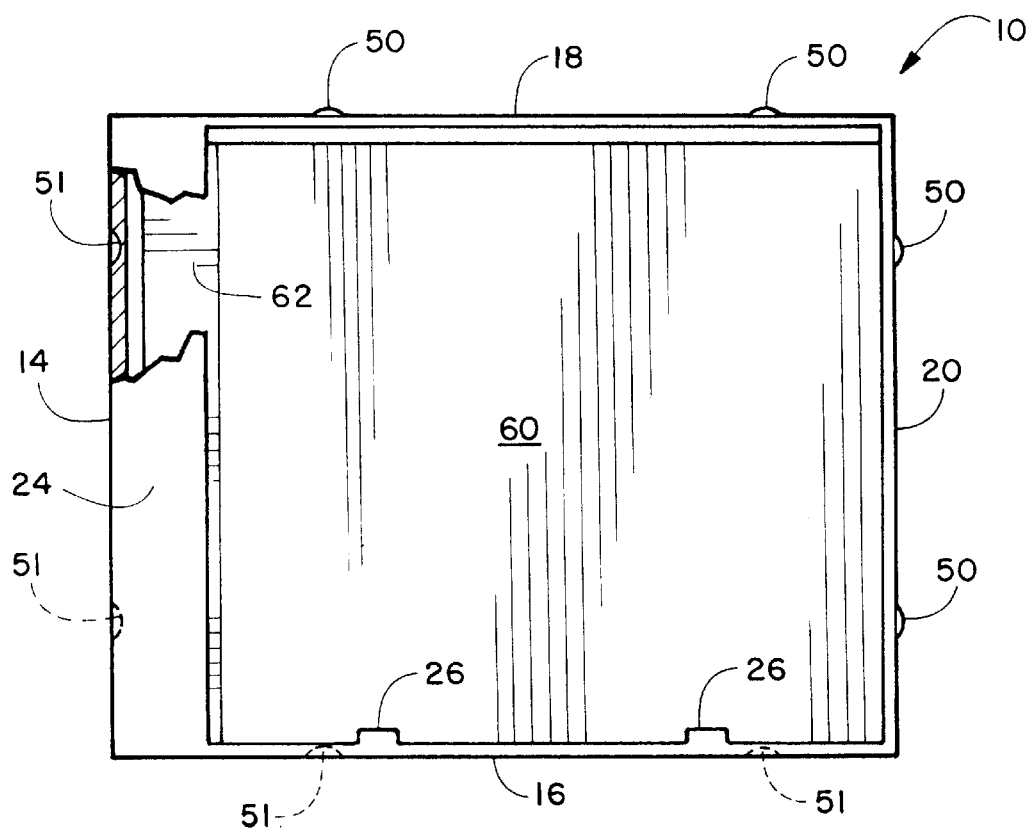
FIG. 5 is a plan view on a second embodiment of the storage unit with a case contained therein.
Figures 7, 8:
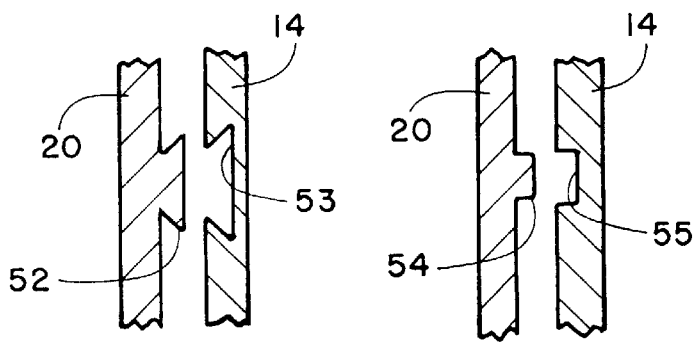
FIGS. 7 and 8 are detailed views of alternate embodiments of the registration members for the storage unit.

When multiple single storage units 10 are used to form a storage and display system, they may be aligned in any manner desired by the user; i.e., vertically aligned, horizontally aligned, both vertically and horizontally aligned, diagonally aligned, staggered, or any combination thereof. It is envisioned that a combination vertical and horizontal alignment will dominate. Using the embodiment of the storage unit 10 bearing the pin-like fasteners 42 facilitates such nearly precision alignment. For more exacting alignments, the storage unit 10 further has corresponding registration mechanisms on its side walls 14, 16, 18, 20. FIGS. 5, 7, and 8 illustrate several such registration configurations. For illustration purposes only and not by way of limitation, these include, but are not limited to, tongue-and-groove 50, 51, dove-tail 52, 53, and lan and groove 54, 55. Any such channeling and reciprocal protruberence, however, will suffice. A user need only align one registration side with a corresponding registration side and mount the storage unit 10 into the desired external surface.

The various members (left side 24, bottom 26, top 28, and right side 30) may run the length of the respective perimeter side wall 14, 16, 18, 20, or may be less in length than the respective perimeter side as illustrated in FIG. 5 having the bottom side member 26 so configured. When smaller lengths are used, one or more such members may be attached to its respective side wall. For illustration purposes and not by way of limitation, again FIG. 5 shows the configuration of the bottom side member 26 in such fashion. To more efficiently function as described herein, the storage unit 10 should have at least two side members, preferably one bottom side member 26 of any length and one side member (24 or 30, preferably the left side member 24) of any length, and preferably the full length of the respective side wall. But this configuration is not mandated for basic functionality of the storage unit 10. At a bare minimum, the storage unit 10 can function with at least one upstanding side wall (any such side wall) and at least one side wall member attached thereto to form a space. The force exerted by the bias mechanism 34 will be of sufficient strength to retain the object in the storage unit. Only one side wall need be an upstanding side wall to accommodate its respective side wall member; but two such upstanding side walls (left and bottom preferably) are better. Where only one side wall is upstanding, the remaining side walls consist of the outer perimeter edges of the back plate 12. Of the various side walls, the storage unit 10 need not have a top side wall 18 or a right side wall 20 and will also function as described.

Figure 9:
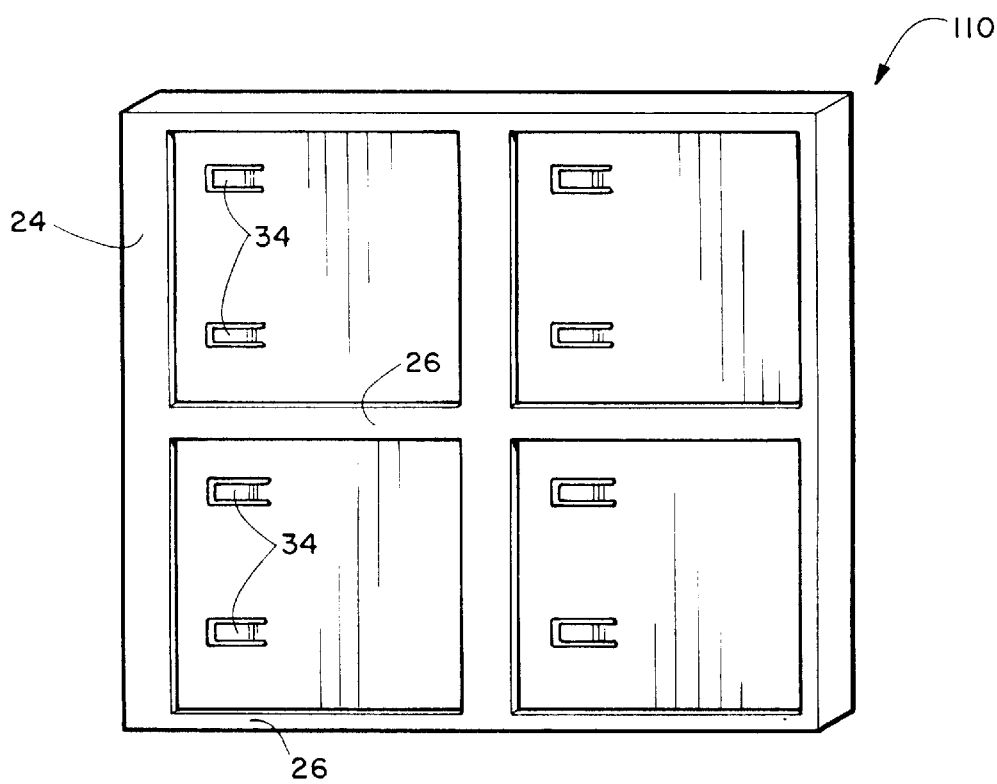
FIGS. 9 and 10 are multi-unit storage systems.
Figure 10:
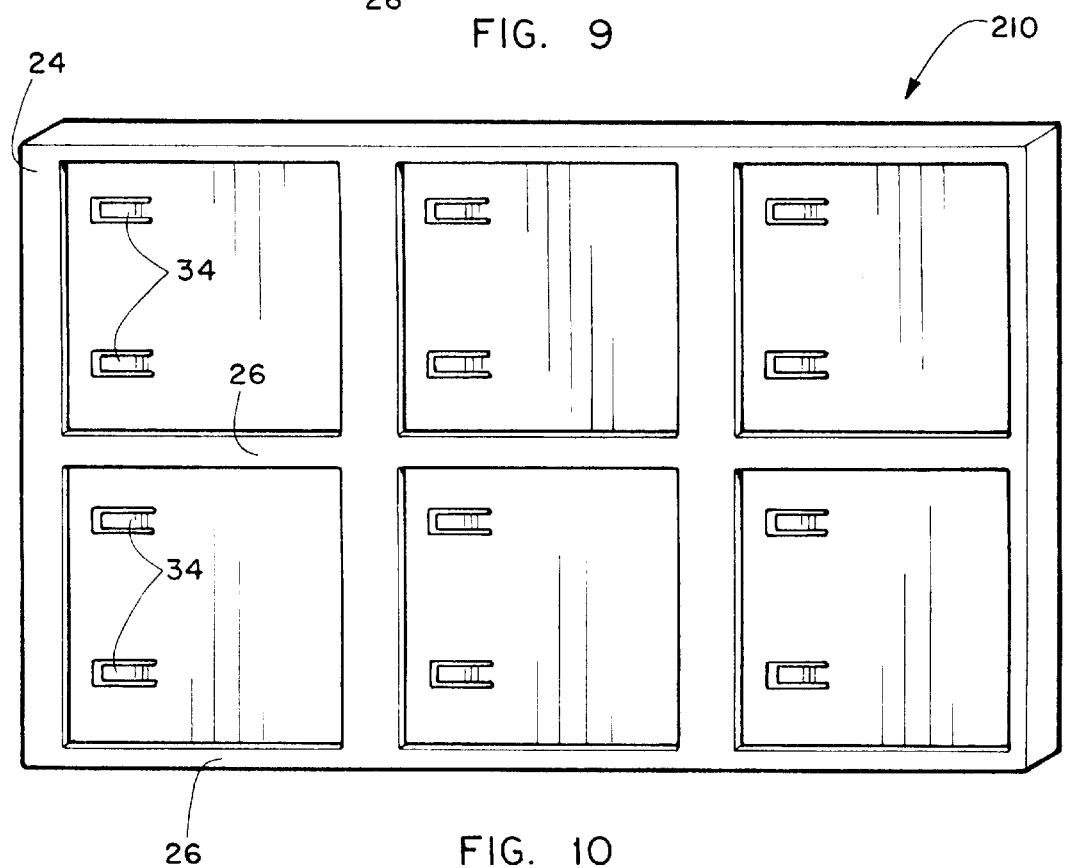

FIGS. 9 and 10 illustrate the storage and display system pre-structured and manufactured as multi-unit systems. Here, for illustration purposes only and not by way of limitation, one such multi-unit system has four storage units 110 while the other multi-unit system has six storage units 210. What must be understood is that for multi-unit systems any quantity of single storage units 10 from two and up may be so manufactured.

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A storage unit for storing and displaying objects comprising:
   a. at least one back plate;
   b. a first side wall adjacent to said at least one back plate;
   c. at least one first side member adjacent to said first side wall and above said at least one back plate forming a first space therebetween; and
   d. a bias means comprising at least one outwardly protruding tab on said at least one back plate for applying outward force to said object as said object is being inserted into said first space and for applying said outward force to said object against said at least one first side member after said object has been seated into said first space thereby retaining said object therein.

2. The storage unit as defined in claim 1 further comprising a second side wall adjacent to said at least one back plate and at least one second side member adjacent to said second side wall and above said at least one back plate forming a second space therebetween, whereby as an object is inserted into said first space, pushed flush with said at least one back plate, and pushed into said second space, it is seated and retained therein.

3. The storage unit as defined in claim 1 further comprising a unit adhering means on said at least one back plate for adhering said storage unit to an external surface.

4. The storage unit as defined in claim 3 wherein said unit adhering means comprises an adhesive on one or more of said at least one back plate.

5. The storage unit as defined in claim 3 wherein said unit adhering means comprises at least one aperture on said at least one back plate adapted to receive a fastener.

6. The storage unit as defined in claim 5 wherein one or more of said at least one aperture further comprises a fastener within, said fastener having a protruding pointed end adapted to insert into an external surface.

7. The storage unit as defined in claim 6 wherein said protruding pointed end of said fastener further comprises a rippled outer surface.

8. The storage unit as defined in claim 6 wherein said fastener is fixedly attached to one or more of said at least one aperture.

9. The storage unit as defined in claim 6 wherein said fastener is removably attached to one or more of said at least one aperture.

10. The storage unit as defined in claim 9 wherein one or more of said at least one aperture has a threaded inner surface and said fastener has a threaded end corresponding with said at least one aperture threaded inner surface.

11. The storage unit as defined in claim 2 further comprising a registration means for aligning one storage with at least one of another storage unit.

12. The storage unit as defined in claim 11 wherein said registration means comprises a corresponding tongue-and-groove configuration between said at least one first side wall of said one storage unit and said at least one second side wall of said another storage unit.

13. The storage unit as defined in claim 11 wherein said registration means comprises a corresponding dove-tail configuration between said at least one first side wall of said one storage unit and said at least one second side wall of said another storage unit.

14. A storage unit for storing and displaying objects comprising:
   a. at least one back plate;
   b. a first side wall adjacent to said at least one back plate;
   c. a second side wall adjacent to said at least one back plate and said first side wall;
   d. at least one first side member adjacent to said first side wall and above said at least one back plate forming a first space therebetween;
   e. at least one second side member adjacent to said second side wall and above said at least one back plate forming a second space therebetween; and
   f. a bias means comprising at least one outwardly protruding tab on said at least one back plate for applying outward force to said object as said object is being inserted into said first space and for applying said outward force to said object against said at least one first side member after said object has been seated into said first space thereby retaining said object therein.

15. The storage unit as defined in claim 14 further comprising a unit adhering means on said at least one back plate for adhering said storage unit to an external surface.

16. The storage unit as defined in claim 15 wherein said unit adhering means comprises an adhesive on one or more of said at least one back plate.

17. The storage unit as defined in claim 15 wherein said unit adhering means comprises at least one aperture on said at least one back plate adapted to receive a fastener.

18. The storage unit as defined in claim 17 wherein one or more of said at least one aperture further comprises a fastener within, said fastener having a protruding pointed end adapted to insert into an external surface.

19. The storage unit as defined in claim 18 wherein said protruding pointed end of said fastener further comprises a rippled outer surface.

20. The storage unit as defined in claim 18 wherein said fastener is fixedly attached to one or more of said at least one aperture.

21. The storage unit as defined in claim 18 wherein said fastener is removably attached to one or more of said at least one aperture.

22. The storage unit as defined in claim 21 wherein one or more of said at least one aperture has a threaded inner surface and said fastener has a threaded end corresponding with said at least one aperture threaded inner surface.

23. The storage unit as defined in claim 14 further comprising a third side wall adjacent to said at least one back plate and to any other side wall, and a fourth side wall adjacent to said at least one back plate and to any other side wall.

24. The storage unit as defined in claim 23 further comprising at least one third side member adjacent to said third side wall and above said at least one back plate forming a third space therebetween.

25. The storage unit as defined in claim 24 further comprising at least one fourth side member adjacent to said fourth side wall and above said at least one back plate forming a fourth space therebetween.

26. The storage unit as defined in claim 23 further comprising a registration means for aligning one storage unit with at least one of another storage unit.

27. The storage unit as defined in claim 26 wherein said registration means comprises a corresponding tongue-and-groove configuration between said at least one first side wall of said one storage unit and said at least one second, third, or fourth side wall of said another storage unit.

28. The storage unit as defined in claim 26 wherein said registration means comprises a corresponding dove-tail configuration between said at least one first side wall of said one storage unit and said at least one second, third, or fourth side wall of said another storage unit.

\* \* \* \* \*